United States Patent Office 3,468,647
Patented Sept. 23, 1969

3,468,647
CERAMIC-METAL SEAL
Archie G. Buyers and Augustus J. Mohr, Jr., Los Angeles, Calif., assignors to Hughes Aircraft Company, Culver City, Calif., a corporation of Delaware
No Drawing. Continuation of application Ser. No. 308,629, Sept. 13, 1963. This application Oct. 4, 1967, Ser. No. 675,007
The portion of the term of the patent subsequent to Jan. 30, 1985, has been disclaimed
Int. Cl. C03c 27/02
U.S Cl. 65—59                                 11 Claims

ABSTRACT OF THE DISCLOSURE

A method of bonding high temperature ceramic to refractory metal, or preparing it for such bond, by heating alumina ceramic and tantalum to above 1950° C., preferably in contact with molybdenum for bonding thereto, and cooling to form an intermediate compound containing tantalum.

---

This invention relates to a method of producing bonds or seals between a body of ceramic material and a body of metal, and more particularly to a method of making a hermetically tight ceramic-metal seal or joint of the type employed in electrical equipment. This application is a continuation of Ser. No. 308,629 filed Sept. 13, 1963, now abandoned.

The difficulty of making a strong, reliable, hermetic seal capable of withstanding vibration over a wide range of temperatures is well known in the art. Such seals are required as interelectrode seals for thermionic converters, sealing components for use in high temperature vacuum tubes, bonding heat shielding ceramics, sealing together various ceramic and metal parts used in high temperature systems, etc. Among the difficulties encountered in making a satisfactory high temperature stable ceramic-metal seal or bond are differences in thermal expansion of the ceramic and metal in terms of rate and extent, differences in crystal habit for either of the seal components, interfacial energies which prevent wetting of one component by the other, and the formation of intermediate bonding compounds whose properties are incompatible with those of the original seal components. Consequently it is very difficult to make a ceramic metal seal or bond which will exhibit satisfactory stability at temperatures much above about 1200° C.

Accordingly, it is an important object of this invention to provide a method of making a ceramic-metal seal or bond having very high temperature stability.

Another object of the invention is to provide a method of making a high temperature stable ceramic-metal seal or bond which is suitable for use with electrical equipment such as thermionic converters, vacuum tubes, and the like.

A further object is to provide a ceramic-metal seal or bond having strength, reliability and hermetic properties both at extremely low temperatures and very high temperatures.

Additional objects of this invention will become apparent from the following description, which is given primarily for purposes of illustration, and not limitation.

Stated in general terms, the objects of this invention are attained by making a ceramic to metal seal or bond by bringing together in contact a body of alumina ceramic and a body of tantalum, or tantalum foil and molybdenum metal, in an inert atmosphere, or vacuum, which is defined herein as an inert atmosphere and raising the temperature of the bodies in the zone of contact to a temperature above about 1950° C. at which aluminum tantalate compound is formed and the bodies seal or bond to each other.

The alumina ceramic employed in making the seals of the invention can be made by standard commercial processes, known to the technology, which produce fired, sintered or hot pressed alumina bodies. However, the alumina ceramic used in this invention can contain relatively large amounts of other suitable metal, high temperature compounds. By suitable compounds is meant any oxide or refractory mixture capable of containing alumina which will bond with tantalum or tantalum-containing metals through the formation of bonding intermediates, containing tantalum, of the type described hereinbelow. Mixtures of magnesia (25–30 mole percent) and alumina (70–75 mole percent); mixtures of alumina (1–50 mole percent) and aluminum carbide (99–50 mole percent) $Al_4C_3$; and mixtures of alumina-chromia in all compositions.

The tantalum and molybdenum metal, in addition to pure tantalum or pure molybdenum metal, can be an alloy of tantalum or molybdenum with metals which are compatible with tantalum or molybdenum. Among these alloying metals are tungsten, rhenium, niobium, and other high melting or refractory metals. An example of one such alloy is the alloy containing 90% tantalum and 10% tungsten.

The inert atmosphere employed in forming the seal or bond is formed by the use of an atmosphere gas such as argon, helium, or another of the inert gases, or mixtures thereof, or it can be a vacuum or a partial vacuum.

The temperature of the alumina ceramic and tantalum base metal preferably is raised to a temperature above about 1950° C., the temperature at which the compound aluminum tantalate is formed, and preferably not above about 2000° C. An induction heating furnace has been used for this purpose but other suitable heating means, such as electrical resistance, arc, or electron beam methods, can be used. The heating cycle employed consists of heating the seal components to about 1950 to about 2000° C., and then allowing the bond or seal to cool to room temperature.

The following example illustrates the use of the method of the invention to produce high temperature stable seals:

EXAMPLE 1

An alumina ceramic consisting of 99.0 percent alumina was brought into contact with pure tantalum metal and placed in an induction heating furnace in an atmosphere of argon. The heating cycle employed consisted of immediate heating of the seal components to about 1950° C., followed by maintaining this temperature for about five minutes, and subsequent cooling to room temperature at a rate sufficiently slow to prevent thermal stresses from cracking the alumina. The resulting seals were stronger than the ceramic bodies. The bonded region withstood immersion in liquid nitrogen and repeated cycling from room temperature to 2000° C. during short time intervals, of about one to two minutes. The alumina frequently broke as the result of thermal shock. An X-ray diffraction analysis indicated that the intermediate compound, aluminum tantalate, $Al_6Ta_4O_{19}$, which produces the bond or seal, was formed.

EXAMPLE 2

The pure tantalum metal employed in Example 1 was replaced by molybdenum metal faced with tantalum foil. The heating cycle of Example 1 was employed and the resulting seal produced had properties similar to those produced by the method of Example 1.

Obviously many other modifications and variations of the present invention are possible in the light of the above teachings. It is therefore to be understood that within the scope of the appended claims the invention can be practiced otherwise than as specifically described.

What is claimed is:

1. A method of making a ceramic-metal seal which comprises the steps of:
    (a) bringing a body of tantalum base metal into contact with a body of alumina ceramic;
    (b) enclosing the contacted bodies in an inert atmosphere; and
    (c) raising the temperature of the contacted bodies to a value between about 1950° C. and about 2000° C. to bond the body of tantalum base metal to the body of alumina ceramic at the zone of contact.

2. A method of making a ceramic-metal seal which comprises the steps of:
    (a) bringing a body of alumina ceramic into contact with a body of tantalum base alloy;
    (b) enclosing the contacted bodies in an inert gas atmosphere;
    (c) raising the temperature of the contacted bodies between about 1950° C. and about 2000° C. to form bonding intermediate compounds containing tantalum; and
    (d) cooling the resulting bonded bodies to ambient temperatures.

3. A method of making a ceramic-metal seal which comprises the steps of:
    (a) bringing a body of molybdenum metal into contact with a thin tantalum foil which is in turn in contact with an alumina ceramic;
    (b) enclosing the contacted materials in an inert atmosphere; and
    (c) raising the temperature of the contacted materials to a value between about 1950° C. and about 2000° C. to bond the molybdenum metal to the alumina ceramic at their zones of contact with the inserted tantalum foil.

4. A method of making a ceramic-metal seal which comprises the steps of:
    (a) bringing a body of alumina ceramic into contact with a tantalum foil which in turn is in contact with molybdenum metal alloy;
    (b) enclosing the contacted bodies in an inert atmosphere;
    (c) raising the temperature of the contacted bodies between about 1950° C. and about 2000° C. to form bonding intermediate compounds containing tantalum; and
    (d) cooling the resulting bonded bodies to ambient temperatures.

5. A method of making a ceramic-metal seal which comprises the steps of:
    (a) bringing a body having a composition of magnesia of about 25–30 mole percent and alumina of about 75–70 mole percent based on the mixture, into contact with a body of tantalum base alloy;
    (b) enclosing the contacted bodies in an inert atmosphere;
    (c) raising the temperature of the contacted bodies between about 1950° C. and about 2000° C. to form bonding intermediate compounds containing tantalum; and
    (d) cooling the resulting bonded bodies to ambient temperatures.

6. A method of making a ceramic-metal seal which comprises the steps of:
    (a) bringing a body of alumina—aluminum carbide ceramic consisting essentially of a binary mixture, where alumina is present in more than about 1 to 50 mole percent based on the binary mixture, into contact with a body of tantalum base alloy;
    (b) enclosing the contacted bodies in an inert atmosphere;
    (c) raising the temperature of the contacted bodies between about 1950° C. and about 2000° C. to form bonding intermediate compounds containing tantalum; and
    (d) cooling the resulting bonded bodies to ambient temperatures.

7. A method of making a ceramic-metal seal which comprises the steps of:
    (a) bringing a body of alumina—chromia ceramic into contact with a body of tantalum base alloy;
    (b) enclosing the contacted bodies in an inert gas atmosphere;
    (c) raising the temperature of the contacted bodies between about 1950° C. and about 2000° C. to form bonding intermediate compounds containing tantalum; and
    (d) cooling the resulting bonded bodies to ambient temperatures.

8. A method of making a ceramic-metal seal which comprises the steps of:
    (a) bringing a body of magnesia-alumina ceramic consisting essentially of 25–30 mole percent magnesia and 75–70 mole percent alumina based on the mixture into contact with a body of tantalum;
    (b) enclosing the contacted bodies in an inert gas atmosphere;
    (c) raising the temperature of the contacted bodies between about 1950° C. and about 2000° C. to form bonding intermediate compounds containing tantalum; and
    (d) cooling the resulting bonded bodies to ambient temperatures.

9. A method of making a ceramic-metal seal which comprises the steps of:
    (a) bringing a body of magnesia-alumina ceramic consisting essentially of 25–30 mole percent magnesia and 75–70 mole percent alumina based on the mixture into contact with a body of tantalum foil which is in turn in contact with a molybdenum containing metal;
    (b) enclosing the contacted bodies in an inert gas atmosphere;
    (c) raising the temperature of the contacted bodies between about 1950° C. and about 2000° C. to form bonding intermediate compounds containing tantalum; and
    (d) cooling the resulting bonded bodies to ambient temperatures.

10. A method of making a ceramic-metal seal which comprises the steps of:
    (a) bringing a body of alumina-aluminum carbide ceramic, consisting essentially of 1–50 mole percent alumina based upon the mixture, the balance being aluminum carbide, into contact with tantalum foil which is in turn in contact with molybdenum metal;
    (b) enclosing the contacted bodies in an inert gas atmosphere;
    (c) raising the temperature of the contacted bodies between about 1950° C. and about 2000° C. to form bonding intermediate compounds containing tantalum; and
    (d) cooling the resulting bonded bodies to ambient temperatures.

11. A method of making a ceramic-metal seal which comprises the steps of:
    (a) bringing a body of alumina-chromia ceramic into contact with a tantalum foil which is in turn in contact wth a molybdenum body;
    (b) enclosing the contacted bodies in an inert gas atmosphere;
    (c) raising the temperature of the contacted bodies between about 1950° C. and about 2000° C. to form bonding intermediate compounds containing tantalum; and (d) cooling the resulting bonded bodies to ambient temperatures.

References Cited

UNITED STATES PATENTS

| | | | |
|---|---|---|---|
| 3,254,403 | 6/1966 | Buyers et al. | 29—473.1 |
| 3,365,779 | 1/1968 | Buyers et al. | 29—498 |
| 3,074,143 | 1/1963 | Smith | 65—59 XR |
| 3,142,886 | 8/1964 | Bronson et al. | |

DONALL H. SYLVESTER, Primary Examiner

J. H. HARMON, Assistant Examiner

U.S. Cl. X.R.

29—472.9; 65—32, 36, 42, 43